May 28, 1946.                     W. H. PARMELEE                     2,401,180
                        METHOD OF MAKING MOLDED PLASTIC ARTICLES
                                  Filed March 19, 1943
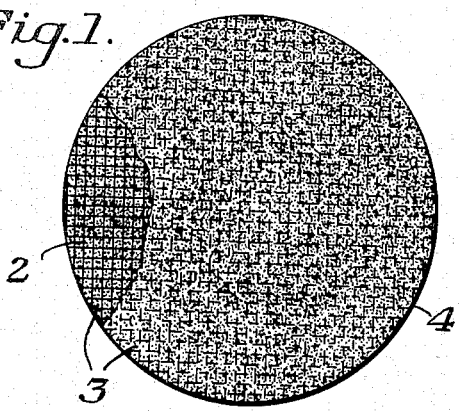
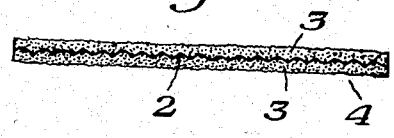
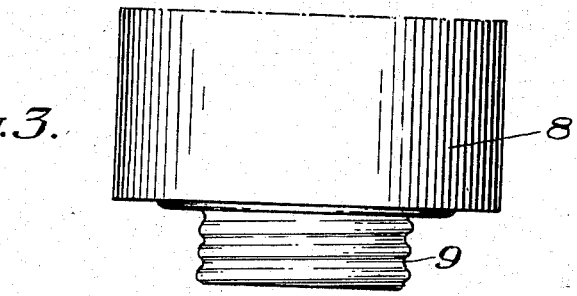
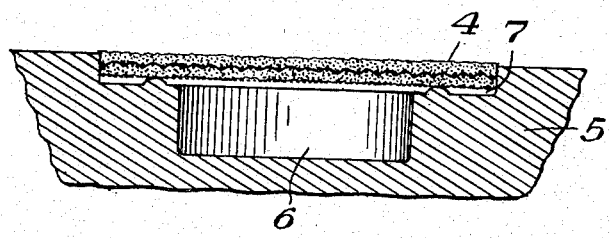
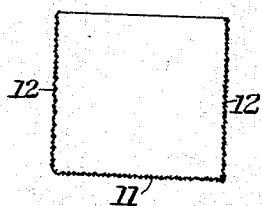
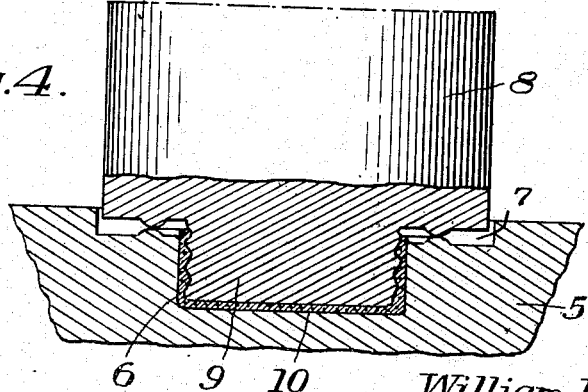
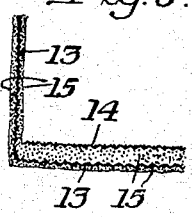
INVENTOR
William H. Parmelee
by his attorneys
Christy, Parmelee & Strickland Patented May 28, 1946

2,401,180

UNITED STATES PATENT OFFICE 2,401,180

METHOD OF MAKING MOLDED PLASTIC ARTICLES

William H. Parmelee, Bethel Township, Allegheny County, Pa., assignor to Wheeling Stamping Company, Wheeling, W. Va., a corporation of West Virginia Application March 19, 1943, Serial No. 479,719

3 Claims. (Cl. 18—56)

This invention relates to a method for making molded plastic articles. More particularly, this invention is for plastic articles which are reinforced by having incorporated therein a reinforcing material, such as cotton duck, impregnated paper or other fibrous sheet material or textile, including sheets made of fiber glass and asbestos.

In the applications of A. B. McGinnis, Serial No. 453,386, filed August 3, 1942, and Serial No. 480,015 filed March 22, 1943, both of which McGinnis applications are assigned to my present assignee, there is disclosed a method of making reinforced molded hollow articles, such as bottle caps, by charging into a mold cavity a preform of molding compound, and also placing over or in the mold a reinforcing member impregnated with a reactive resin compatible with the molding compound. Under heat and pressure in the mold, the molding compound flows over the surface of the reinforcing member and the reinforcing member is simultaneously molded to its final shape, resulting in an article, such for example, as a bottle cap, having a resin impregnated reinforcing layer covered by a molded resinous layer bonded thereto by reaction of the molding powder and resin impregnated in the reinforcing sheet.

Under some circumstances, it is desirable to form a reinforced article of quite thin wall section but which shall nevertheless be quite rigid. For example, it may be desirable to produce a very rigid but quite thin bottle or closure cap. Difficulty is encountered in such cases in forcing the plastic molding compound to flow in a very thin mold space, and the enormous pressure and friction of the plastic flowing between a mold surface and a fabric reinforcing sheet may cause the sheet to tear or be displaced from the mold, or the plastic may not cover completely the reinforcing member. Also, the resin impregnated in the fabric may be forced out of the fabric so that the adhesion between the fabric is not as satisfactory as is desirable in certain articles.

Moreover, in many articles it is desirable to have the layer of molded plastic on each surface of the reinforcing sheet, whereas with the methods disclosed in the said McGinnis applications it is difficult to accomplish this, particularly in articles having a thin wall section.

According to the present invention, provision is made for distributing the molding compound to better advantage over the reinforcing sheet so that the molding compound itself will have to flow to a substantially lesser extent under heat and pressure in the mold. This materially reduces the friction between the molding compound and the reinforcing material and avoids tearing of the reinforcing material and also assures even distribution of the molding compound, even on articles of quite thin wall section. The invention also enables the molding compound to be applied readily to both surfaces of the reinforcing material where this found to be desirable and even in this case achieve a relatively thin wall section.

According to my invention, a reinforcing sheet, preferably impregnated with reactive resinous material, is coated with loose molding compound. Any suitable molding compound may be used, these compounds usually comprising a reactive, resinous material and a filler such as wood flour. This molding compound is held on the reinforcing sheet by means of an adhesion substance which is compatible with resin. One material which is particularly useful for this purpose is furfural. Other suitable adhesives, however, may be used, as, for example, phenol resin in a liquid phase. In practising the invention, the reinforcing sheet, such as duck impregnated with resinous material, has a surface coating of the adhesive, such as furfural, applied thereto. Molding compound is then coated onto the adhesively coated sheet. With suitable use of the adhesive the thickness of molding compound can be built up to any desired extent. For most articles of thin wall section a single coating of adhesive followed by a generous sprinkling of molding compound is sufficient. My invention may be more fully understood by reference to the accompanying drawing, in which:

Figure 1 is a top plan view of a reinforcing body having the coating of molding compound applied thereto;

Figure 2 is a transverse section through the piece of material shown in Figure 1;

Figure 3 shows the disk-like piece of Figure 1 laid in position over the top of the mold cavity;

Figure 4 shows the completion of the molding operation;

Figure 5 represents a transverse section through a reinforcing sheet which has been shaped prior to being coated and which is prepared for receiving the coating; and Figure 6 is a fragmentary view of a portion of a hollow object in which two coated reinforcing sheets are used in part of the preformed article and a single coated sheet in another part of the same article.

In the drawing, 2 designates a continuous sheet of reinforcing material of a fibous nature as, for example, cotton duck. Instead of using cotton duck the reinforcing sheet may be formed of paper, asbestos, fiber glass, or any similar material. It is preferably impregnated with a reactive resinous compound. Impregnated cloth of this character is now generally available. One or both surfaces of the reinforcing sheet are coated with an adhesive material. As above indicated, this adhesive material is of a substance compatible with the resinous molding compound and furfural is preferably used, but instead of using furfural, some other adhesive substance may be employed as, for example, a phenol resin in a liquid phase or a liquid resinous compound such as those used in laminating, as for example, the so-called "varnish" containing incompletely reacted resin in a solvent. To the wet surface of the coated sheet a commercial resinous molding powder is applied. This molding powder is held in place by the adhesive. Where a particularly thick coating of molding compound is necessary, the dry molding compound may be mixed with furfural or other adhesive and spread upon the coated surface of the sheet. In the drawing, 3 designates the applied layer of coating compound on each surface of the reinforcing sheet, but it is apparent that the compound may be applied to one surface only of the sheet. The sheet may be cut to a predetermined shape before the coating is applied, or large sheets may be coated after which disks or other shapes, such as shown in Figure 1, are cut therefrom. The composite disk of reinforcing material and molding compound is designated generally as 4.

In use, the coated sheet material, after being cut to proper form, is placed over the top of a mold cavity. In Figures 3 and 4, 5 designates a die block having a cavity 6 therein. Above the top of the cavity 6 the die block is recessed, as indicated at 7, to receive the composite disk 4. A cooperating upper press member is designated 8 and it carries a positive die, such as the force pin 9, for cooperation with the mold cavity 6. The molds are operated at the temperatures and at the pressures commonly employed for molding operations of this character. When the disk 4 is in position the cooperating mold members are brought together, whereupon the sheet is formed to the desired shape and the molding compound is cured to produce the reinforced composite article 10.

Because of the fact that the molding powder is already distributed over the surface of the reinforcing sheet, the molding compound does not have to flow any great distance in the mold and does not have to seek out and fill small crevices, as is the case where heat and pressure are alone relied upon to cause the plastic material to flow through the mold.

In the resulting article, the reinforcing sheet is embedded in a layer of molded plastic. The molded plastic has far greater rigidity than a single thickness of impregnated fabric or cloth molded to shape would have. It is possible with the invention to provide an article such, for example, as a bottle cap or a jar closure having a very thin wall section, which will not split when the cap is screwed tightly onto the bottle or the jar and which will not deform under ordinary conditions of usage.

In Figures 1 to 4 I have illustrated a method wherein the reinforcing sheet and the plastic material are simultaneously pressed to shape from a flat sheet. In the making of some articles, particularly hollow articles having very deep side walls, it may be found desirable to first shape the fabric or other reinforcing material and then apply the coating of molding compound. This is illustrated in Figure 5 in which the reinforcing sheet is first formed into a box-like structure and then has the coating applied thereto, as previously described, after which it is subjected to heat and pressure. In Figure 5 the sheet material is shaped to provide a bottom portion 11 and side portions 12. It is also within the contemplation of my invention that coated sheets may be sandwiched together where more than a single thickness of reinforcing material is desired or where it is desired that one part of an article shall have a wall thickness substantially greater than that of another part of the same article. One such method is illustrated in Figure 6 where there is one reinforcing sheet 13, having the molding compound coated thereon. A second sheet 14 coated on one side only is laid over only a part of the reinforcing sheet 13, there being a molding compound 15 between the two sheets and on both sides of the sheet 13. When this form as thus prepared is subjected to heat and pressure, the bottom may be relatively thick as compared to the side walls and will have additional strength by reason of the two reinforcing layers.

While I have illustrated and described certain specific embodiments of my invention, it will be understood that this is merely by way of illustration and that while the invention lends itself particularly to the manufacture of bottle caps and closures, it is applicable also to the making of other molded objects and that various other changes and modifications may be made within the contemplation of my invention and under the scope of the following claims.

I claim:

1. The process of making thin but rigid cup like molded plastic articles, which comprises the steps of first providing a blank formed of a reinforcing flat sheet of fibrous material that is impregnated with a reactive resinous compound, then applying an adhesive material to said blank, then applying a layer of resinous molding powder to said adhesive, whereby said adhesive retains such molding powder on the blank and then shaping and molding the thus produced composite sheet by forcing the central portion of said blank out of its original horizontal plane to form a cup shaped article.

2. A process as set forth in claim 1 wherein the adhesive material comprises furfural.

3. A process as set forth in claim 1 wherein the adhesive material comprises phenol resin in liquid phase.

WILLIAM H. PARMELEE.